United States Patent [19]
Quirk et al.

[11] 3,725,718
[45] Apr. 3, 1973

[54] FLAME-SPRAYED FERRITE POWDER X-RAY RADIATION SHIELD

[75] Inventors: Virgil P. Quirk; James M. Titlar, both of Saint Marys, Pa.

[73] Assignee: Stackpole Carbon Company, Saint Marys, Pa.

[22] Filed: Apr. 29, 1969

[21] Appl. No.: 828,066

[52] U.S. Cl..............313/313, 117/123 A, 250/108, 313/59, 313/334
[51] Int. Cl................................................H01j 1/52
[58] Field of Search........313/59, 334, 313; 250/108; 117/123 A

[56] References Cited

UNITED STATES PATENTS 2,820,720   1/1958   Iversen.........................117/123 A X
2,291,406   7/1942   Paehr..................................313/59 X

OTHER PUBLICATIONS

Kirichok, et al., (Izv. Vyssh. Ucheb. Zaved., Fiz. 1968, 11(8), pp. 154–156 (Russ.).), Chem. Abst. Vol. 69, 91411y (1968).

Domsa, A. et al., (Inst. Politechnic, Cley, Romania), Met. Constructia Masini 14,865–9(1962). Chem. Abst. Vol. 58, 8711c (1962)

Kirichok, Ukr. Fiz. Zh. 11(1), 91–5(1966)(Ukrain). Chem. Abst. Vol. 64, 11977f (1966).

Steatit, Brit. 959,789, Chem. Abst. Vol. 61, (P)4051c (1964).

*Primary Examiner*—David Schonberg
*Assistant Examiner*—Toby H. Kusmer
*Attorney*—Brown, Murray, Flick and Peckham

[57] ABSTRACT

Ferrite powder is flame sprayed onto a glass or ceramic substrate to form a continuous coating, in which the powder is fused together and to the substrate to form a radiation shield. When the substrate is the glass envelope of a television receiver high voltage rectifier tube, such a shield in the correct location will absorb most of the X-rays that otherwise would be emitted by the tube.

2 Claims, 2 Drawing Figures

INVENTORS.
VIRGIL P. QUIRK
JAMES M. TITLAR
BY
Brown, Murray, Flick & Peckham
ATTORNEYS.

FLAME-SPRAYED FERRITE POWDER X-RAY RADIATION SHIELD

It is among the objects of this invention to provide a radiation shield for electrical purposes, which is easily made, which is inexpensive, which is durable and which can be very thin. Other objects are to provide a method of making such a shield, which is quick and easy, and which allows a radiation absorption coating to be applied permanently to the element being shielded.

Figure 1:
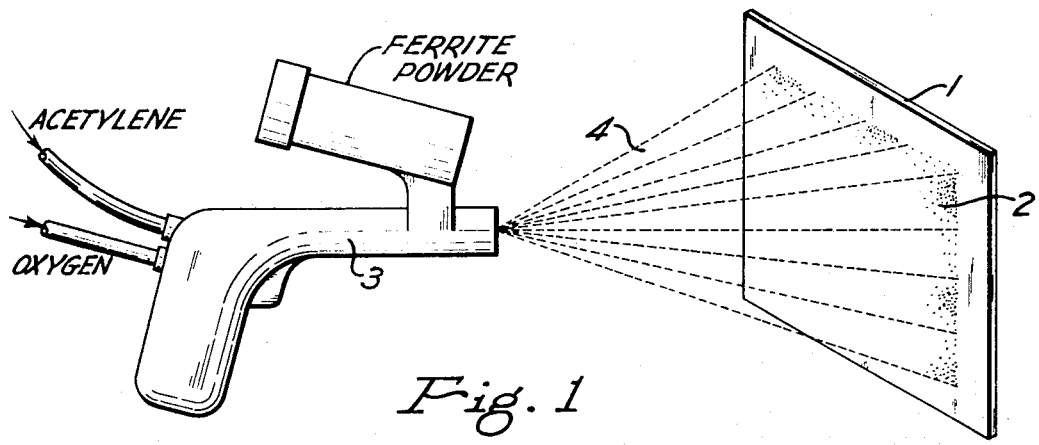
Figure 2:
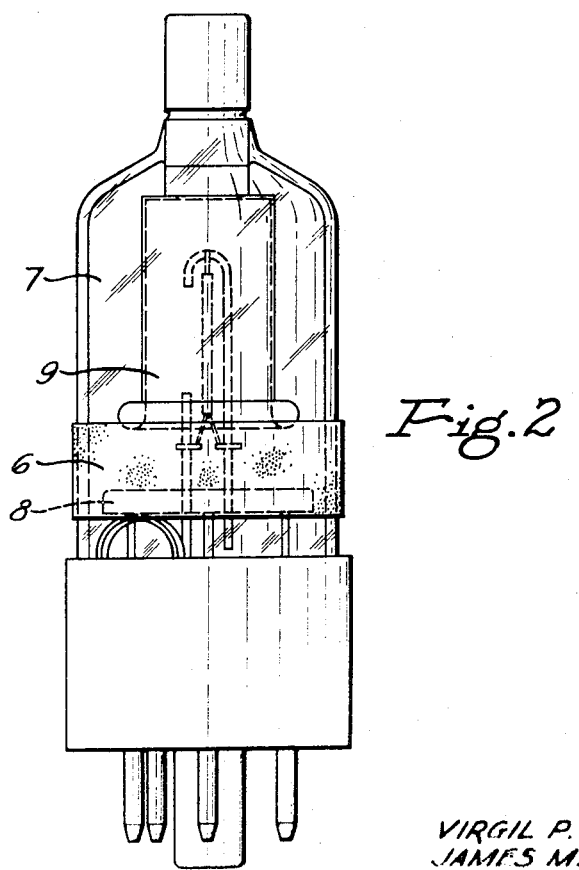

The preferred embodiment of the invention is illustrated in the accompanying drawings, in which FIG. 1 is a side view showing ferrite powder being flame sprayed onto a flat substrate; and FIG. 2 is a side view of a high voltage rectifier tube provided with our radiation shield.

Referring to FIG. 1 of the drawings, a glass or ceramic substrate 1 can take any desired shape, flat or otherwise, depending upon the purpose which it is to serve. Likewise, the substrate may have any desired thickness, again depending upon its use. In some cases it may be less than 0.010 inch thick. Applied to one or more surfaces of the substrate is a continuous film or coating 2 of ferrite powder, such as for example, nickel-zinc ferrite, barium ferrite, lead ferrite or manganese-zinc ferrite. This coating is applied by flame spraying, which is done by feeding the powder to a known flame gun 3, from which it is blown by a pressurized burning stream of acetylene gas and oxygen that heats the powder 4 to a high temperature as it leaves the gun. The exit temperature of the gun must be high enough so that when the ferrite powder strikes the substrate, the powder will still be hot enough to fuse together and to the substrate to form a continuous coating. This means that in many cases the powder should leave the gun at a temperature over 5,000° F.

The best type of ferrite powder to use is spray dried powder, because it is more free flowing than other types. Of course, it must be free of any binder. The powder is calcined after spray drying, to strengthen the grains so they will not break up in the flame spraying process. Instead of delivering preformed powder to the gun, the flame gun can be the type that consumes a ferrite rod by melting it and blowing the resulting hot ferrite particles or powder away from it and onto the substrate. In either case, ferrite powder is heated to a high temperature and substantially simultaneously sprayed onto the substrate.

It is best to use a substrate with the same coefficient of thermal expansion as the ferrite to avoid warping of the substrate by the hot ferrite powder sprayed onto it. It also is advantageous to preheat the substrate above its strain point. If the substrate is flat, it can be preheated by placing it on a flat hot slab of graphite for example. The preheating will help to prevent warping and also will improve the bond between the ferrite coating and the substrate.

This invention can be used for shielding printed circuits, electrode bundles and inductors from electromagnetic radiation or high frequency radio waves.

Depending upon the use, the ferrite coating can be any desired thickness. For many purposes it may be as little as 0.002 inch thick or as much as 0.020 inch thick. Thus, any of these elements can be encapsulated in glass or ceramic material and then coated with a film of ferrite powder by flame spraying. Or, coated flat plates such as shown in FIG. 1 can be placed beside or on opposite sides of the element that is to be shielded.

To produce the desired properties in a ferrite powder heretofore it has been necessary to sinter the powder over a long period of time. Consequently, those skilled in the art believed that a coating of ferrite powder applied by flame spraying would not serve as a satisfactory shield because heating of the powder for only a second or less in the spray gun could not be expected to develop in the ferrite the electro-magnetic properties necessary for shielding. The result actually obtained, therefore, was entirely unexpected and not obvious to those skilled in the art.

One place where this invention is particularly useful is in television receivers, where the high voltage rectifier tubes emit X-rays that are believed by some to be harmful to the viewers. This emission or radiation can be greatly reduced, as shown in FIG. 2, by flame spraying a continuous film-like band 6 of ferrite powder around the glass envelope 7 of such a tube, between the bottom of its shield 8 and the bottom of its anode 9, which is the principal area from which X-rays are emitted. The band or coating may be between 0.004 and 0.014 inch thick, but if it is between 0.006 and 0.009 inch thick it will absorb enough X-rays to reduce harmful radiation by about 60 percent. Most of the rest of the X-ray radiation is absorbed by the surrounding portions of the set, so the expense of a thicker X-ray shield is not required. One big advantage of this ferrite coating is that it is a unitary part of the high voltage tube because it is fused to the glass. Self-supporting X-ray absorption bands that have been placed around such tubes in the past can inadvertently be omitted in the first instance, or later left off by a TV service man. Such things cannot happen with this invention.

It will be realized that the fused ferrite coating of this invention is very stable and will not crack or peel or deteriorate at any temperature it is subjected to in use. The substrate of the shield needs to be only thick enough to support the ferrite coating, so the shield can be very thin and, therefore, it will take up but little space.

We claim:

1. The combination with a television receiver high voltage rectifier tube that emits X-rays and has a glass envelope, of a radiation shielding band encircling the outside of said envelope around the X-ray emitting area of the tube to materially reduce radiation of X-rays from the tube, said band being a flame-sprayed continuous coating of ferrite powder ($Fe_2O_3$) fused together and to said glass envelope.

2. A radiation shield according to claim 1, in which said coating is between 0.004 and 0.014 inch thick.

* * * * *